United States Patent [19]

Hestehave et al.

[11] 4,333,905
[45] Jun. 8, 1982

[54] METHOD FOR BLOWMOLDING A CONTAINER

[75] Inventors: Borge Hestehave, Alta Loma; Kjeld Hestehave, Upland, both of Calif.

[73] Assignee: Bomatic, Inc., Ontario, Calif.

[21] Appl. No.: 197,151

[22] Filed: Oct. 15, 1980

[51] Int. Cl.³ .......................................... B29C 17/07
[52] U.S. Cl. ................................. 264/529; 264/531; 264/534
[58] Field of Search ............... 264/523, 524, 525, 529, 264/531, 534; 425/530

[56] References Cited

U.S. PATENT DOCUMENTS

| | | | |
|---|---|---|---|
| 3,050,773 | 8/1962 | Hagen | 264/534 |
| 3,138,279 | 6/1964 | Meissner | 264/524 X |
| 3,424,829 | 1/1969 | Peters et al. | 264/529 X |
| 3,555,134 | 1/1971 | Marcus | 264/534 |
| 3,949,034 | 4/1976 | Uhlig | 264/534 X |
| 4,117,062 | 9/1978 | Uhlig | 264/534 |
| 4,177,239 | 12/1979 | Gittner et al. | 264/529 X |

*Primary Examiner*—Jan H. Silbaugh
*Attorney, Agent, or Firm*—Craig and Antonelli

[57] ABSTRACT

A method for blow molding of containers with a thickened bead at the bottom end thereof by the steps of extruding a tubular parison, closing the mold thereabout, preblowing the parison within a mold cavity under low pressure so as to partially inflate the parison to a major extent, raising the bottom wall of the mold cavity so as to contact the partially inflated parison in a manner forming a thickened bead between bottom and surrounding adjacent mold cavity wall parts, and thereafter finish-blowing the parison within the mold cavity with a blow medium under high pressure so as to inflate the parison to the intended finished size before opening of the mold for removal of the container.

12 Claims, 5 Drawing Figures

METHOD FOR BLOWMOLDING A CONTAINER

BACKGROUND OF THE INVENTION

The present invention relates to a method for the blow molding of plastic containers with a thickened bead at the bottom thereof.

Blow molding has been developing into a highly commercially successful means for producing numerous articles. However, many types of containers, such as those having sharp contour transition portions located at the bottom thereof, and particularly containers having thickened beads at the bottom thereof like a typical one gallon paint can, have not been produced by blow molding to any commercially significant degree due to the problem of thinning of the plastic material at the lower corner extremeties.

In smaller containers, the thinning problem, in some circumstances, has not posed a problem with respect to the blow molding of containers which do not require thickened beads at the lower end thereof; but, the production of a solid uniform bead at the lower end thereof has not been possible in any simple and highly reliable manner. This problem of reliably forming a solid lower end bead is even more accute in the production of larger containers. This problem has been sufficiently significant that in many cases the shape of the container has been redesigned so as to have a shape that does not have sharp transition areas so as to minimize the thinning problem, while in other cases where reinforcements and/or beads are required, separate reinforcing components have been placed into the molds so as to become embedded in the finished container. However, the use of separate reinforcing parts greatly increases the cost to manufacture containers by blow molding, while in other instances commercial considerations make it undesirable to change the standard shape and/or size that has been long in use for a given product.

To deal with the problem of unduly thin and weakened corners, it has been proposed (U.S. Pat. No. 3,585,262) to prepinch the parison and preblow it with a low pressure medium in the range of about 1-20 psi prior to insertion of the parison into the mold, and then to finish-blowing the parison, after closing of the mold, with a high pressure medium on the order of about 100 to 130 psi. However, this technique has not fully solved the problem and has not been adapted to the manufacture of containers with beads at their lower end.

Prior art attempts to blow mold containers with unitary beads have generally utilized a compression step for formation of these beads. Furthermore, these methods have generally required the use of either multiple molds (see, e.g., U.S. Pat. No. 4,117,062, U.S. Pat. No. 3,843,005) or the extrusion of a parison having wall portions of increased thickness which can be pinched between telescopable mold wall portions. The latter technique is only suitable for use in the formation of side wall beads and not beads at the bottom wall of a container, while in both instances these techniques greatly increase the cost of producing containers by blow molding.

SUMMARY OF THE INVENTION

It is thus an object of the present invention to provide a method whereby plastic containers can be blow molded with a thickened bead at the bottom end thereof with a high degree of reliability and a minimization of expenditure.

Another object of the present invention is to provide a blow molding method wherein a hollow container with a solid thickened bead at the lower end thereof can be reliably blow molded within a single mold.

To this end, the present invention provides a method for blow molding of containers with a thickened bead at the bottom end thereof by the steps of extruding a tubular parison, closing the mold thereabout, preblowing the parison within a mold cavity under low pressure so as to partially inflate the parison to a major extent, raising the bottom wall of the mold cavity so as to compact the partially inflated parison in a manner forming a thickened bead between bottom and surrounding adjacent mold cavity wall parts, and thereafter finish-blowing the parison within the mold cavity with a blow medium under high pressure so as to inflate the parison to its intended finished size before opening of the mold for removal of the container.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
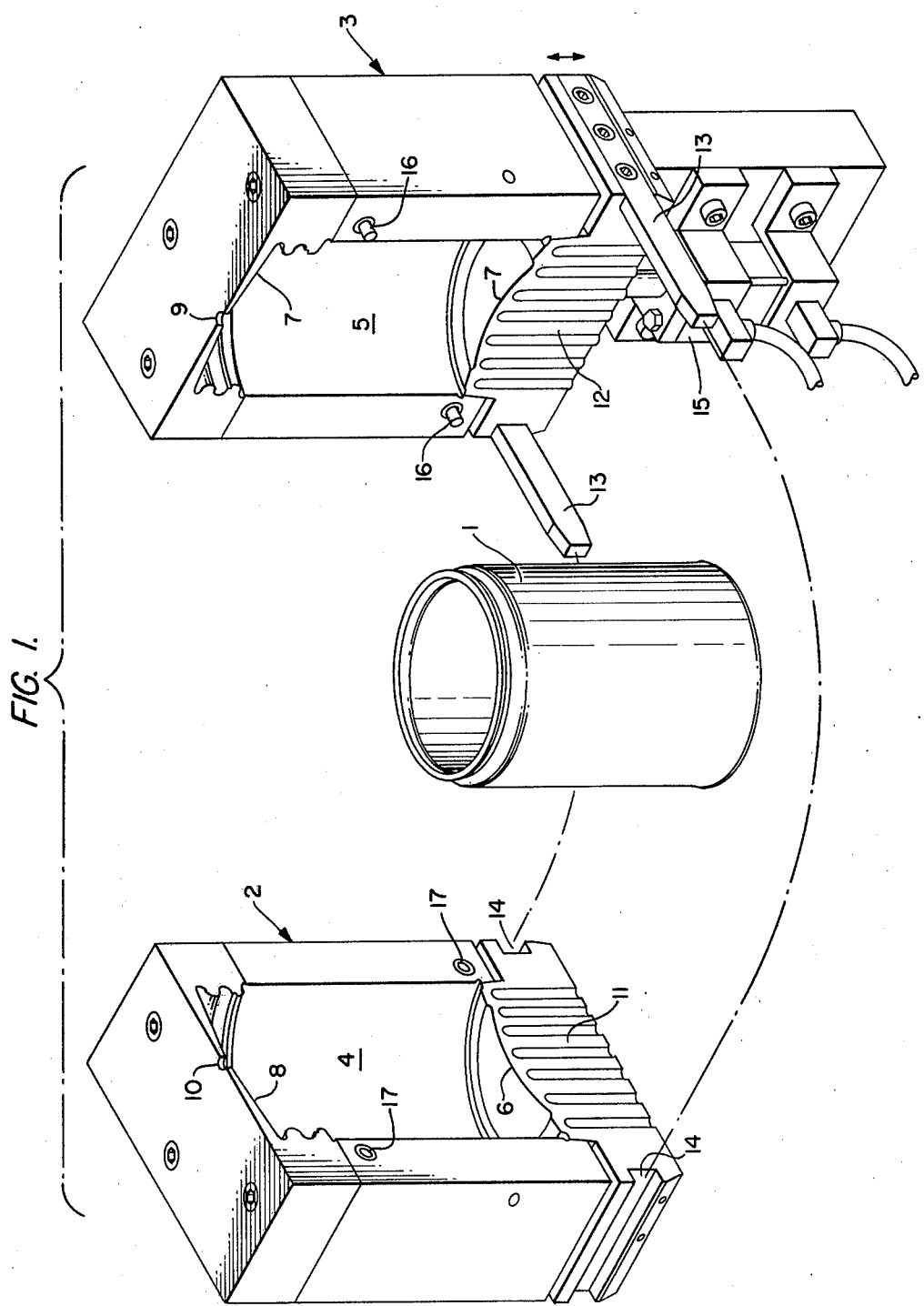
FIG. 1 is a perspective illustration showing two open mold halves for use in practicing the present invention as well as a container as produced thereby.

FIG. 1 shows a container of the type conventionally utilized for selling single gallons of paint and which are characterized by a cylindrical body, a lip at the mouth thereof for receipt of a snap-on closure lid and a perimetric bead at the edge of its bottom upon which the can rests. However, as opposed to the conventional one gallon paint can, the can 1 is formed of blow molded, high density polyethylene instead of metal. The can 1 is produced, simultaneously with an unshown cover therefor, in a mold cavity defined by the two mold halves 2, 3, shown therebehind.

Each mold half contains a semi-cylindrical cavity side wall part 4, 5 and a vertically displaceable bottom mold part.

Figure 4:
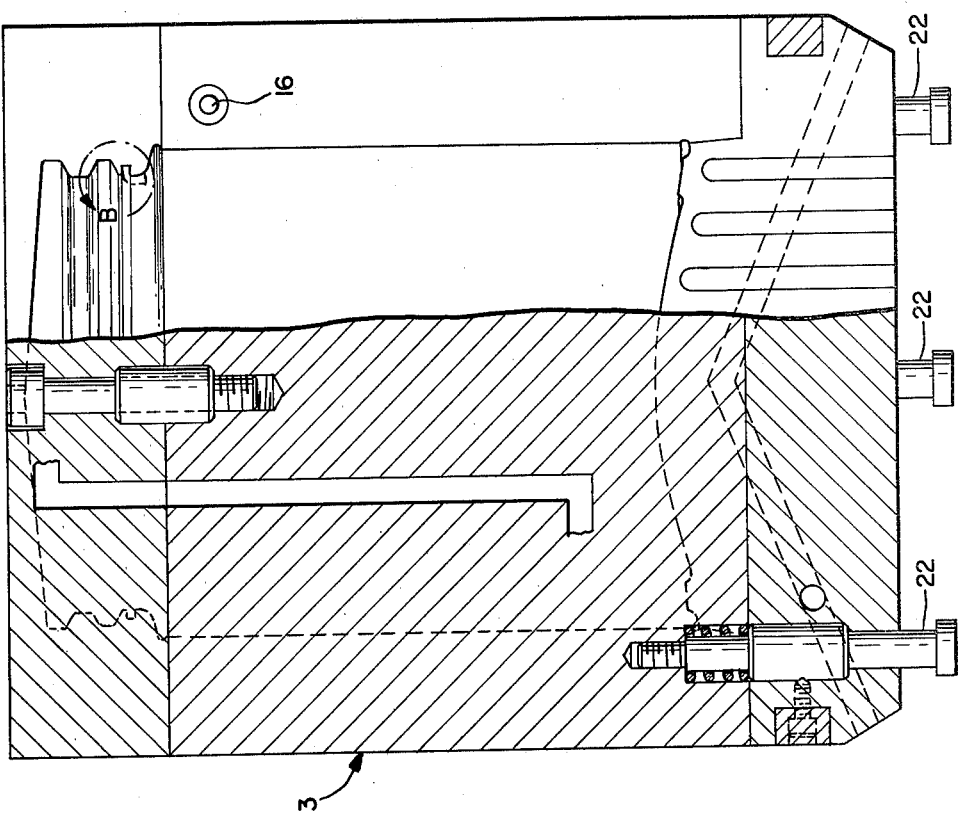
FIG. 4 is a sectional view taken along line A—A of FIG. 3.

The side wall mold parts 4, 5 are provided with top wall portions 7, 8. Top portions 7,8 have semi-circular cutouts 9, 10 which, when the molds are in their closed position, define a circular opening for insertion of a conventional blow pin (not shown). The bottom wall mold parts 6, 7 have mating side surfaces 11, 12 for pinching and sealing the lower end of an extruded parison in a known manner. In use, the mold bottom parts 6 and 7 are coupled together by rods 13 which engage in complementarily shaped recesses 14 for guiding movement of the mold parts 2, 3 toward and away from each other under the action of mold opening and closing unit (not shown). Mold parts 4, 5 are likewise provided with coupling pins 16 for mating in recesses 17 when the molds are closed to ensure proper matching of the mold cavity halves. The bottom parts 6, 7 are slidably mounted upon bolts 22 for reciprocation toward and away from cavity wall parts 4, 5 under action of a hydraulic cylinder unit 15. Both mold halves are cooled through internal circulation of a cooling medium through the passages illustrated in broken line in FIGS. 2-4.

Figure 2:
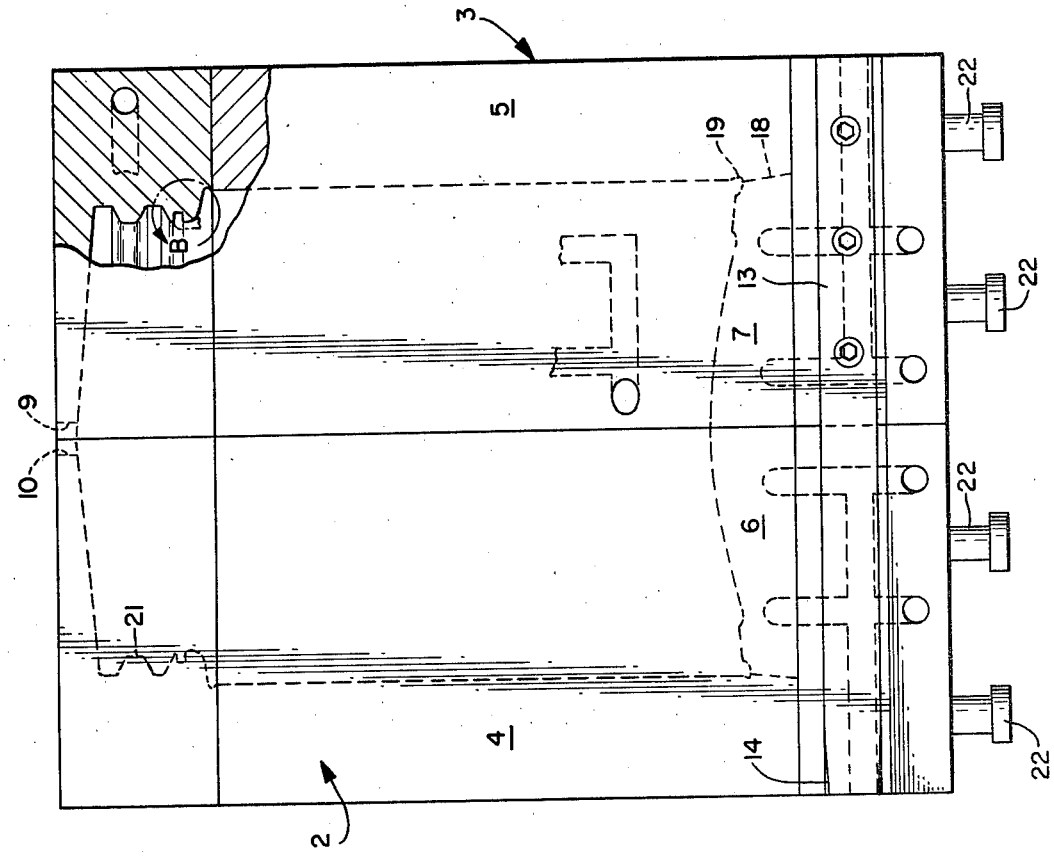
FIG. 2 is a side elevational view of the two mold halves of FIG. 1 with the mold bottom displacement mechanism removed.
Figure 3:
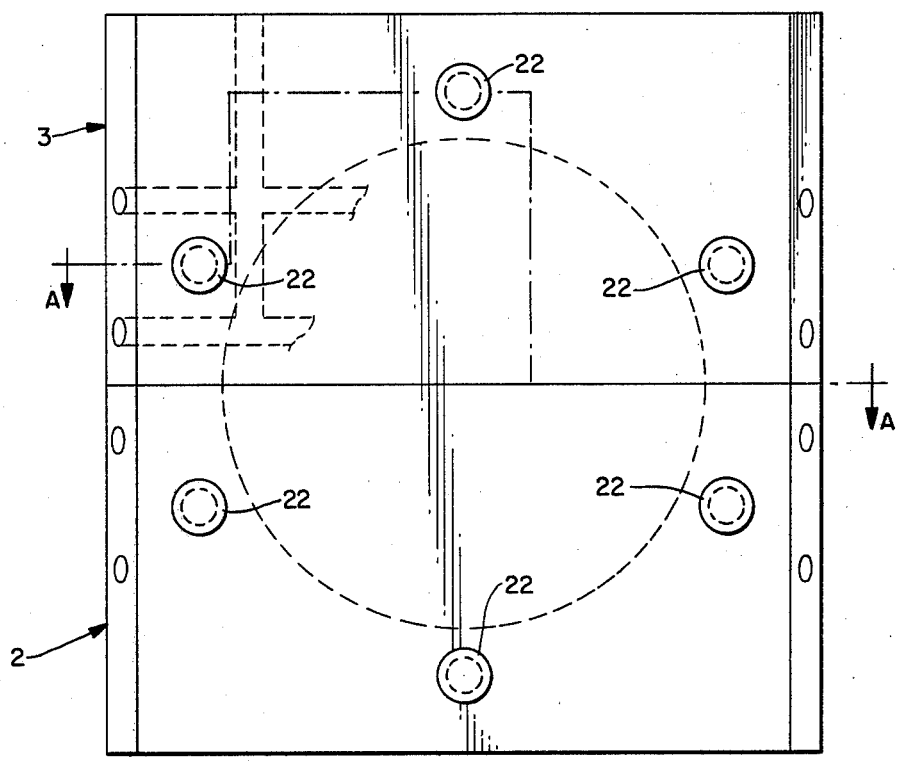
FIG. 3 is a bottom view of the mold halves shown in FIG. 2.
Figure 5:
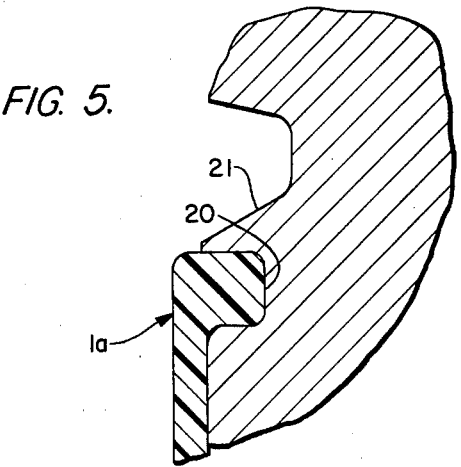
FIG. 5 is an enlarged illustration of detail B of FIGS. 2 and 4.

As most clearly seen from FIG. 2, the mold bottom parts 6, 7, in their upwardly displaced positions, mate with the mold side wall parts 4, 5 along a slight (approximately 5°) conical interface 18 and together define a perimetric, bead forming, recess area 19. Detail B shows a container lip-forming formation 20 which enables a snap-on closure for the container to be formed simultaneously with the container along the wall portion 21 disposed above formation 20. The connection between the container closure and the rim 1a of the container is easily severed after removal of the container from the mold after cooling because, as can be seen from FIG. 5, lip-forming formation 20 is recessed into the mold wall at a location adjoining closure forming surface 21 so that surface 21 overlies the lip formed by formation 20, but not the wall of the container itself. This, as should be apparent, provides a defined area at which the closure can be severed from the container and a proper dimensional fit between the closure and container.

The details with regard to the practice of the method according to the present invention will now be described with reference to the production of the above-noted one gallon paint can, it being recognized that the specific times, sizes, and the like are only intended by way of example, and that the specific parameters will vary with the production of different size and shaped containers.

Firstly, for the production of a six inch diameter one gallon container, a three inch diameter parison is extruded by a conventional parison extrusion machine so as to extend between the mold halves 2, 3. After a parison of sufficient length has been extruded, the mold halves 2, 3 are caused to close upon the parison so as to pinch and seal same between the top walls 7, 8 and the bottom part surfaces 11, 12.

A conventional blow needle (not shown) of approximately a one-half inch diameter is then inserted through the hole defined by the recessed areas 9, 10 of the top wall 7, 8. A blowing medium, such as air, is then supplied into the interior of the parison within the mold cavity by way of the blow needle. The blowing medium is supplied at a pressure of approximately 15–20 psi for approximately one-half to one second. This is sufficient to enlarge a three inch high density polyethylene parison of one-eighth inch wall thickness to approximately 95% of its final size. The bottom wall of the mold cavity formed by the parts 6, 7 (which up to this point have been downwardly displaced approximately one-half inch from the position shown in FIG. 2 so as to rest upon the heads of the bolts 22) is then caused to be raised into its FIG. 2 position by action of the hydraulic cylinder unit 15. This causes a double wall thickness of the parison to be compressed within the circumferential bead forming recess 19 so as to form a uniform, solid bead. At this point, blowing of the parison is finished by admission of a high pressure blowing medium, such as air, into the partially inflated parison via the blow needle. The high pressure medium is preferably at a pressure of approximately 80 to 100 psi and is admitted for a period of time of approximately 15 to 20 seconds.

The parison then has been inflated into its intended finished size and the high pressure medium is exhausted from the interior of the containers. After the container has sufficiently cooled under action of the cooling medium circulated through the mold halves, the mold bottom formed by the parts 6, 7 is then returned to its lowered position. The parts 6, 7 as is known, are configured to grip and pull-off the tail flash from the container bottom during lowering thereof. The molds are then opened from the container bottom during lowering thereof. The molds are then opened so as to permit the finished container to be ejected.

It is noted that during the preblowing step under low pressure, the parison will expand into contact with portions of the mold side walls, but such poses no problems. Additionally, as noted above, the various parameters are adjustable in adapting the present method to various other shaped articles; however, maintenance of the blowing medium pressures noted above is considered to be very important as is the relative duration and extent of inflation achieved during the preblowing and finish-blowing steps.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A method for the blow molding of a plastic container with a thickened bead at the bottom thereof comprising the steps of:
   (a) extruding a tubular parison between parts of a blow mold;
   (b) closing said mold parts about said parison so as to define a molding cavity of a greater size than the intended finished size of said container;
   (c) preblowing said parison within said molding cavity with a blowing medium under low pressure so as to partially inflate said parison to approximately 95% of said finizhed size has been inserted;
   (d) raising a molding cavity bottom wall part of said blow mold so as to compact 2 double-wall thickness of said partially inflated parison in a manner forming a thickened bead in a circumferential bead forming recess between said bottom wall part and adjacent surrounding molding cavity parts;
   (e) finish-blowing said parison within said molding cavity with a blowing medium under high pressure so as to inflate said parison to said intended finished size; and
   (f) opening said mold parts for removal of said container.

2. A molding method according to claim 1, wherein said closing step is performed so as to pinch closed said parison at the top and bottom of said mold cavity.

3. A molding method according to claim 1, wherein said preblowing step is performed with said low pressure blowing medium being at a pressure of about 15–20 psi.

4. A molding method according to claim 3, wherein said finish-blowing step is performed with said high pressure blowing medium being at a pressure of about 80–100 psi.

5. A molding method according to claim 4, comprising the step of cooling said mold parts after said finish-blowing step and prior to said opening step.

6. A molding method according to claim 4, wherein said parison is formed of high density polyethylene.

7. A molding method according to claim 1 or 3 or 4, wherein said parison is brought into contact with a portion of side walls of said molding cavity during said preblowing step.

8. A molding method according to claim 1 or 3 or 4, wherein said raising step produces a bead of approximately the same thickness as the wall thickness of the extrude parison and wherein said blowing steps produce a container having a side wall thickness approximately half that of said extruded parison.

9. A method according to claim 8, wherein said extruding step is performed so as to produce a parison of an approximately 3 inch diameter and a 0.125 inch wall thickness, and wherein said blowing steps produce a container approximately 6 inches in diameter with a wall thickness of approximately 0.050–0.070 inches.

10. A method according to claim 8, wherein said preblowing is performed for approximately 0.5–1.0 seconds and said finish-blowing is performed for approximately 15–20 seconds.

11. A method according to claim 1 or 3 or 4, wherein said preblowing is performed for approximately 0.5–1.0 seconds and said finish-blowing is performed for approximately 15–20 seconds.

12. A method according to claim 1 or 3 or 4, wherein a snap-on closure for said container is formed simultaneously with said container and connected to said container at an upper rim thereof by a severable connection by expanding said parison into a formation for forming a radially-projecting lip at an upper rim of the container that is recessed into an upper part of a container side wall defining portion of the mold cavity and into a closure forming cavity portion located thereabove, said closure forming cavity portion having a surface portion that adjoins and overlies the lip-forming formation, whereby said severable connection is formed at a defined area of separation created between the closure and radially-projecting container lip at the container rim.

* * * * *